(12) United States Patent
Adachi

(10) Patent No.: US 7,718,164 B2
(45) Date of Patent: May 18, 2010

(54) OPTICALLY COLORED BODY AND OPTICAL STRUCTURE

(75) Inventor: Eiki Adachi, Kanagawa (JP)

(73) Assignee: L'Oreal S.A., Paris (FR)

( * ) Notice: Subject to any disclaimer, the term of this patent is extended or adjusted under 35 U.S.C. 154(b) by 718 days.

(21) Appl. No.: 11/472,328

(22) Filed: Jun. 22, 2006

(65) Prior Publication Data

US 2007/0008608 A1   Jan. 11, 2007

Related U.S. Application Data

(60) Provisional application No. 60/692,580, filed on Jun. 22, 2005.

(51) Int. Cl.
*A61K 8/18* (2006.01)
*A61Q 1/12* (2006.01)
*G02B 26/00* (2006.01)

(52) U.S. Cl. .......................... 424/69; 359/296
(58) Field of Classification Search ................ 424/69; 359/296
See application file for complete search history.

(56) References Cited

U.S. PATENT DOCUMENTS

| 7,064,886 B2* | 6/2006 | Moon et al. ................ 359/321 |
| 2004/0137028 A1 | 7/2004 | de la Poterie | |

FOREIGN PATENT DOCUMENTS

| DE | 43 28 069 A1 | 2/1995 |
| EP | 1 002 528 A1 | 5/2000 |
| JP | 61-215603 | 9/1986 |
| JP | 2000-341031 | 12/2000 |
| JP | 2004-170447 | 6/2004 |
| WO | WO 2004/083283 A1 | 9/2004 |

OTHER PUBLICATIONS

European Search Report for EP 06 25 3182, dated Sep. 28, 2006.
S. Cammas, "Thermo-responsive polymer nanoparticles with a core-shell micelle structure as site-specific drug carriers," Journal of Controlled Release, vol. 48, pp. 157-164 (1997).
English language abstract of JP 61-215603, Sep. 25, 1986.
English language abstract of JP 2000-341031, Dec. 8, 2000.
English language abstract of JP 2004-170447, Jun. 17, 2004.
Development of Advanced Cosmetics, CMC Publishing Co., Ltd., 297-306 (2000).

* cited by examiner

*Primary Examiner*—Evelyn A. Lester
(74) *Attorney, Agent, or Firm*—Finnegan, Henderson, Farabow, Garrett & Dunner, LLP

(57) ABSTRACT

The present disclosure relates to an optically colored body comprising at least one micelle, wherein the micelle comprises a liquid medium and colloid microcrystals having aggregates of spherical nano-particles and a cosmetic composition comprising the optically colored body. The present disclosure also relates to an optical structure comprising at least one substrate, and at least one wall that covers the at least one substrate and has optical transparency, wherein the space between the at least one substrate and the at least one wall is filled with colloid microcrystals having arrays of spherical nano-particles. Further, the present disclosure relates to a cosmetic composition comprising at least one optically colored body and/or at least one optical structure and a method for producing the optical structure.

11 Claims, 4 Drawing Sheets

OPTICALLY COLORED BODY AND OPTICAL STRUCTURE

This application claims benefit of U.S. Provisional Application Ser. No. 60/692,580, filed Jun. 22, 2005, the contents of which are incorporated herein by reference.

The present disclosure relates to an optically colored body, and to an optical structure for expressing color due to reflection, interference, refraction and absorption, that may be employed, for instance, in a cosmetic composition.

The present disclosure also relates to cosmetic compositions, comprising at least one optically colored body and at least one optical structure as described above, in a cosmetically acceptable medium.

In the field of cosmetic products, pigments, colorants, dyes and other such substances are widely used as coloring materials for coloring cosmetic ingredients. Coloring may be carried out by mixing these coloring materials into a cosmetic ingredient composition, so that the cosmetic ingredient being employed becomes affixed with pigment and/or colorant, and/or dyed with a dye. In the case of such conventional coloring materials as these pigments, colorants and/or dyes, differences may occur in the wavelength characteristics of the light reflected from the surface of the coloring material due to differences in the wavelength-dependency of absorbance, i.e., due to differences in the absorption spectrum characteristics at the surface of the coloring material. As a result, an observer may be cognizant of coloring differences.

In the case of coloring materials such as those described above, the mixing of a plurality of coloring materials has been attempted in order to obtain variety in coloring. In addition, in the case of use as a cosmetic ingredient, additives such as inorganic layered composite powders like mica, pearlescent pigments, and liquid-crystal compounds may be mixed into the composition, for the purpose of adding gloss and/or luster to the surface of the skin, nails or hair.

For example, a color pearling agent, in which a colored powder such as iron oxide, smalt, chromium hydroxide and/or carmine is mixed with or coated onto titanium mica, which has a pearl luster and an interference color, is an ingredient that may be used as a lustrous coloring material in a cosmetic product. See Development of Advanced Cosmetics, CMC Publishing Co., Ltd., 297-306 (2000).

Mixing of conventional coloring materials may lead to a subtractive color mixture due to the absorption of light by each of the respective coloring materials. As a result, it is not always possible to generate the unique characteristics of each of the coloring materials, and the combination of the coloring materials may result in a deterioration in color saturation.

Moreover, additives such as inorganic layered composite powders, pearlescent pigments, and liquid-crystal compounds are themselves colorless or white, or have little variety of color, so that they must be used in combination with other coloring materials in order to obtain the desired coloring. In this case, when such additives are combined with a coloring material that has low color saturation and brightness, it may not always be possible to produce the lustrous sensation desired from these additives.

On the other hand, colored powders that are mixed into the aforementioned color pearling agent, which is a conventional combination deemed to have good color saturation, do not always have superior chemical stability. For example, smalt has poor alkali and thermal resistance, and carmine has poor light fastness.

Further, there are many conventional pigments, colorants, and/or dyes that, depending on the quantity employed, are not entirely harmless with respect to the human body, i.e., effect on skin, etc.

Accordingly, the present disclosure employs a principle that differs from conventional coloring methods using absorption of a portion of light as in the case of conventional coloring materials; rather the present disclosure relates to an optically colored body and optical structure for a non-toxic, chemically stable cosmetic composition that expresses a bright structural color regardless of the direction of view. The present disclosure further relates to a cosmetic composition as described above.

In order to resolve at least one of the aforementioned problems in the art, the present inventors have surprisingly and unexpectedly discovered a novel optically colored body and a novel optical structure for use in a cosmetic composition in which the photonic band effect is employed.

In the field of optics, a structure that has a repeating unit (periodic pattern) of materials of different refractive indices that the period corresponds to the order of light wavelength is known as a "photonic crystal." A structure with a repeating unit having half the length of a given monochromatic light wavelength (though, this varies depending on the refractive index of the medium when the medium is other than air) has a frequency region that does not allow the electromagnetic mode to exist (a photonic band gap), and forbids the monochromatic light. This is referred to as the "photonic band effect." When light is irradiated onto the surface of the aforementioned photonic crystal, light of a specific wavelength within the photonic band gap region corresponding to the length of this repeating unit is completely reflected.

In the field of optics, attempts have been made to employ photonic crystals in optical waveguides or new types of optical fibers by using the property of the photonic band effect, which enables light of a specific wavelength to be completely reflected.

On the other hand, in the field of the cosmetic product of the present disclosure, in order to exploit the photonic band effect, it is necessary that the photonic crystal be formed to express the aforementioned effects and be mixed in a stable state with respect to various cosmetic compositions. In view of this, however, a particulate or spherical color-expressing ingredient in which a photonic crystal has been rendered dispersible in a cosmetically acceptable medium has yet to be reported in the field of cosmetic products.

Thus, a first embodiment of the present disclosure relates to an optically colored body comprising a micelle that contains a liquid medium and colloid microcrystals in which spherical nano-particles, for instance from a single material and having the same diameter, are aggregated. This optically colored body is novel in that the colloid microcrystals selectively reflect and interfere with light of a specific wavelength under light irradiation due to the photonic band gap effect, so as to return light of a specific wavelength. By varying the size of the spherical nano-particles employed in the optically colored body of this embodiment, it is possible to obtain optional optical colors, such as red, green, and blue, in the visible light region.

A second embodiment of the present disclosure relates to an optical structure provided with a substrate and a wall that covers the substrate and is optically transparent, in which the space between the substrate and the wall is filled with colloid microcrystals in which the spherical nano-particles are arrayed. This embodiment of the present disclosure further relates to a production method for this optical structure.

In the second embodiment, the external contour of the optical structure may, for example, have a curved surface, and, further, may be cylindrical or spherical. Further, the optical structure with the substrate using a material that is black in color, and by changing the size of the spherical nano-particles, it may be possible to obtain an arbitrary optical color of a visible light region, such as bright reds, greens, blues, and to consistently obtain a uniform and constant optical color of a visible light region, irrespective of the rotation of the longitudinal axis of a cylindrical optical structure, the rotation of any axis of a spherical optical structure, the direction of the array of the spherical nano-particles, the direction of the light source or the direction of observation.

Further, the surface of the optical structure may be covered by a wall that is non-toxic with respect to the human body. Thus, it is possible to greatly reduce investigation of the effects in the living body on skin, hair, etc., as occurred with conventional pigments, dyes, etc.

The present disclosure further relates to a cosmetic composition that comprises at least one optically colored body and/or at least one optical structure.

BRIEF DESCRIPTION OF THE DRAWINGS

FIG. 1 is a cross-sectional view showing at least one embodiment of the optically colored body of the present disclosure. Optically colored body 10 of the present disclosure comprises a liquid medium 11 and micelles containing colloid microcrystals 13 in which spherical nano-particles 12 of a single material and same diameter are aggregated. In FIG. 1, the micelles are formed in oil by adding a surfactant 14.

Figure 1:
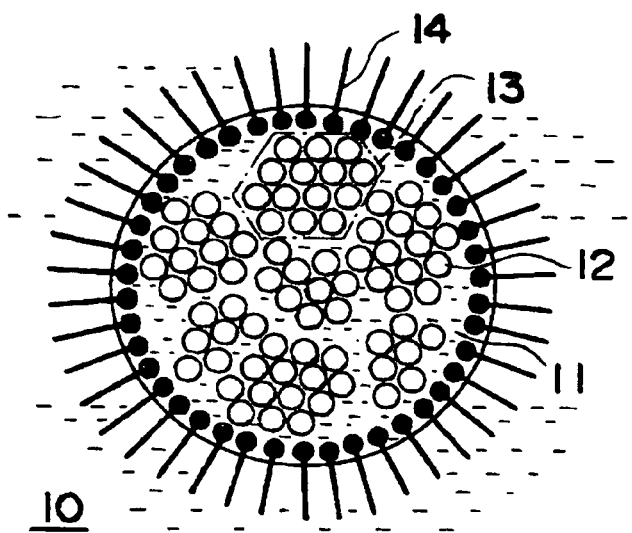
FIG. 1 is a cross-sectional view showing the optically colored body according to at least one embodiment of the present disclosure.

Liquid medium 11 is a liquid having polarity, such as water, an aqueous solvent such as $C_1$-$C_{12}$-monoalcohol, for instance $C_2$-$C_6$-monoalcohol, for example ethanol, and a mixed solvent of these. For example, water may be used and, in this case, the micelle forms a water-in-oil type as shown in FIG. 1.

Colloid microcrystals 13 are microcrystals in a state in which multiple spherical nano-particles 12 are aggregated in a regular array. Spherical nano-particles 12 forming colloid microcrystal 13 may be particles of a single material having the same particle diameter, for example.

Spherical nano-particles 12 are chosen from a material that is optically transparent with respect to light of the desired wavelength that is to be colored by the optically colored body, and that is stable in the liquid medium 11. For example, spherical nano-particles 12 are chosen from a macromolecular polymer such as polystyrene, $(C_1$-$C_{28})$alkyl-polymethacrylate, (C1-C28)alkyl-polyacrylate, for examble methyl polymethacrylate, polyacrylate, polyethylene, polycarbonate, polyurethane, nylon or silicon, or an inorganic material such as glass, silica, or titania. For instance, in the case where the liquid medium 11 is water, polystyrene which has a strong electrostatic repulsive force is may be used, for instance, with particles having a surface electric charge, such as polystyrene particles that may be chosen from, for example, carboxyl groups, sulfonic groups, and amino groups. Further, the material for spherical nano-particles 12 is selected from materials that have a refractive index that is greater than that of liquid medium 11, and, for example, in the case where the liquid medium is water, from materials having a refractive index greater than water's refractive index of 1.33. It is also possible that the refractive index of particles can be smaller than that of the medium.

The size of the particle diameter of spherical nano-particles 12 is chosen from the range of 50-500 nm in accordance with the wavelength of the intended light that is to be returned by the optically colored body. Here, one colloid microcrystal 13 is an aggregate comprising of spherical nano-particles having the same particle diameter. However, with the goal of mixing colors, there is no hindrance to mixing within the same micelle first colloid microcrystals comprising of first spherical nano-particles of the same particle diameter, second colloid microcrystals comprising of the second spherical nano-particles of the same particle diameter, and colloid microcrystals comprising of further types of spherical nano-particles having the same particle diameter.

The micelles may be formulated using any surfactant or emulsifying agent. For example, according to at least one embodiment, an agent that is directly mixed into the cosmetic composition and satisfies the stability required of the desired application is acceptable. It is also acceptable to employ a bridging surfactant in order to improve the stability of the micelles.

The liquid employed in the oil phase is an organic solvent having low absorption with respect to the wavelength of the light that is to be returned by the optically colored body. For example, $(C_6$-$C_{28})$alkanes, for instance $(C_7$-$C_{12})$alkanes such as heptane, octane, nonane, decane and the like may be cited. In order to limit attenuation of the color by returned light, due to light refraction, scattering, etc., for instance, the difference between the refractive indices of the oil phase solvent and water may be small. In the case where it is employed as the optically colored body in a cosmetic composition, the oil solvent may be chosen from a cosmetically acceptable medium. The liquid may be a mixture of liquids that have the aforementioned characteristics.

Figure 2:
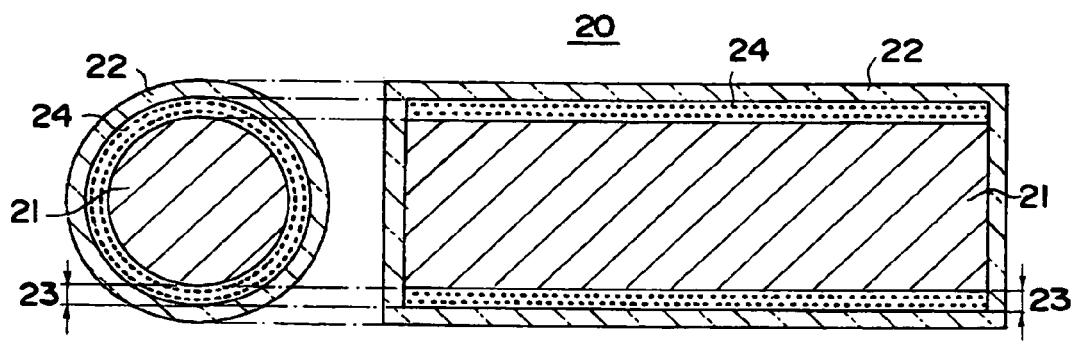
FIG. 2 is a cross-sectional view showing a cylindrical optical structure according to at least one embodiment of the present disclosure.
Figure 3:
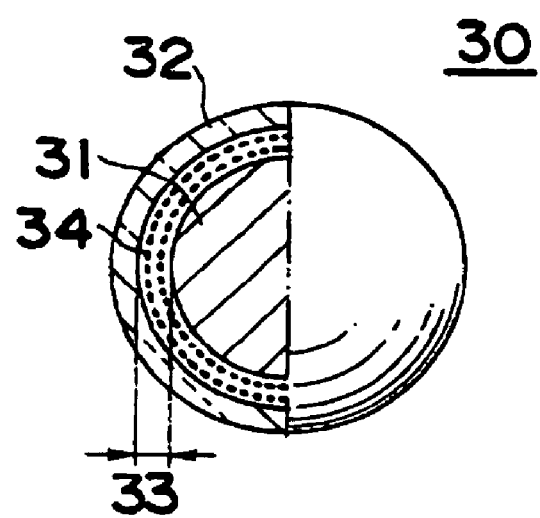
FIG. 3 is a cross-sectional view showing a spherical optical structure according to at least one embodiment of the present disclosure.

FIG. 2 is a cross-sectional view of a cylindrical optical structure, and FIG. 3 is a cross-sectional view of a spherical optical structure, as described in embodiments according to the present disclosure. Optical structures 20, 30 of the present disclosure are provided with a substrate 21, 31 and an optically transparent wall 22, 32 that covers the substrate. The space 23, 33 between substrates 21, 31 and wall 22, 32 is filled with colloid microcrystals 24, 34 in which spherical nano-particles are arrayed.

Substrates 21, 31 may be any shape or size that is suitable for use as a cosmetic composition. However, microparticles in the form of spheres or ellipitical spheres, or in the form of cylinders (rod-shaped) may be used, for example, with a diameter in the circular direction of less than 100 µm. While not completely restricted, the material of substrate 21, 31 includes a material that swells suitably from the suspension of spherical nano-particles in contact with the surface. Organic gels, inorganic gels and resins may be cited, for example. For example, N-isopropylacrylamide (NIPA) gel may be used.

Further, the material of substrate 21, 31 is intended to absorb refracted and scattered light rays other than the intended returned light that is reflected and returned at colloid microcrystal 24, 34 in which the spherical nano-particles are arrayed. For instance, a material with a color that has low color brightness may be used, for example, a material that is black in color.

Wall 22, 32 is a material that has optical transparency with respect to the wavelength of the returning light of the colloid microcrystal, and for example, is transparent in the aforementioned returning light wavelength. Further, for example, wall 22, 32 may be a chemically stable material with respect to the suspension of spherical nano-particles and the medium of the cosmetic composition outside optical structure 20, 30, and is non-toxic to the human body. Examples that may be mentioned include but are not limited to silica, glass, titania, and colorless resin, among others.

The width of space 23, 33 is not restricted to a specific range, but rather is acceptable provided that it is at least be larger than the minimum width at which the colloid microcrystals in which the spherical nano-particles are arrayed express the photonic band effect.

Colloid microcrystals 24, 34 in which spherical nano-particles are arrayed is a colloid microcrystal in which the spherical nano-particles in the spherical nano-particle suspension have been stabilized by electrocstatic repulsive force or by the excluded volume effect.

The liquid for the suspension is acceptable provided that it is one that stabilizes the morphology of the colloid microcrystals. Further, the concentration of the spherical nano-particles in the suspension may be such that it provides a quantity sufficient to adequately cover substrate 21, 31 with the colloid microcrystals when space 23, 33 is filled with the suspension of spherical nano-particles, for instance.

The liquid for rendering the spherical nano-particles into a suspension is selected from media, and mixtures thereof, that can maintain the chemical stability of the spherical nano-particles, and for which the refractive index of the liquid is smaller than the refractive index of the spherical nano-particles. For instance, this medium may cause a substrate comprising an organic gel, inorganic gel or resin material to swell. A liquid having polarity, such as water, $C_1$-$C_{12}$-monoalcohol, for example $C_2$-$C_6$-monoalcohol, and further for example methanol, ethanol, and mixtures thereof.

The present disclosure also relates to cosmetic compositions, comprising at least one optically colored body and/or at least one optical structure as described above, in a cosmetically acceptable medium.

The at least one optically colored body and the at least one optical structure may be present, alone or as a mixture, in the composition according to the present disclosure in an amount ranging from 0.01% to 75% by weight, for instance 0.1% to 20% by weight, such as 0.5% to 10% by weight, or even 1% to 8% by weight, and further for example 1.5% to 5% by weight, relative to the total weight of the composition.

The cosmetic compositions according to the present disclosure comprise, besides the body and structure, a cosmetically acceptable medium, i.e. a medium that is compatible with keratin materials such as facial or bodily skin, the hair, the eyelashes, the eyebrows and the nails.

The composition may thus comprise a hydrophilic medium comprising water or a mixture of water and hydrophilic organic solvent(s), for instance alcohols, such as linear or branched lower monoalcohols containing from 2 to 5 carbon atoms, for instance ethanol, isopropanol or n-propanol, and polyols, for instance glycerol, diglycerol, propylene glycol, sorbitol or pentylene glycol, and polyethylene glycols, or alternatively hydrophilic C2 ethers and C2-C4 aldehydes. The water or the mixture of water and hydrophilic organic solvents may be present in the composition according to the present disclosure in an amount ranging from 0.1% to 99% by weight, for instance from 10% to 80% by weight relative to the total weight of the composition.

As disclosed herein, the composition may be anhydrous. The composition may also comprise a fatty phase which may comprise fatty substances that are liquid at room temperature (in general 25° C.) and/or of fatty substances that are solid at room temperature, such as waxes, pasty fatty substances and gums, and mixtures thereof. These fatty substances may be of animal, plant, mineral or synthetic origin. This fatty phase may also contain lipophilic organic solvents. As fatty substances that are liquid at room temperature, often referred to as oils, which may be used in the invention, non-limiting mention may be made of hydrocarbon-based oils of animal origin such as perhydrosqualene; hydrocarbonbased plant oils such as liquid triglycerides of fatty acids of 4 to 10 carbon atoms, for instance heptanoic or octanoic acid triglycerides, or alternatively sunflower oil, maize oil, soybean oil, grapeseed oil, sesame seed oil, apricot oil, macadamia oil, castor oil, avocado oil, caprylic/capric acid triglycerides, jojoba oil, shea butter; linear or branched hydrocarbons of mineral or synthetic origin, such as liquid paraffin and derivatives thereof, petroleum jelly, polydecenes, hydrogenated polyisobutene such as parleam; synthetic esters and ethers, especially of fatty acids, for instance purcellin oil, isopropyl myristate, 2-ethylhexyl palmitate, 2-octyldodecyl stearate, 2-octyldodecyl erucate, isostearyl isostearate; hydroxylated esters, for instance isostearyl lactate, octyl hydroxystearate, octyldodecyl hydroxystearate, diisostearyl malate, triisocetyl citrate, and fatty alcohol heptanoates, octanoates and decanoates; polyol esters, for instance propylene glycol dioctanoate, neopentyl glycol diheptanoate and diethylene glycol diisononanoate; and pentaerythritol esters; fatty alcohols containing from 12 to 26 carbon atoms, for instance octyldodecanol, 2-butyloctanol, 2-hexyldecanol, 2-undecylpentadecanol and oleyl alcohol; partially hydrocarbon-based fluoro oils and/or partially silicone-based fluoro oils; volatile or non-volatile silicone oils, linear or cyclic polymethylsiloxanes (PDMSs), which are liquid or pasty at room temperature, for instance cyclomethicones, dimethicones, optionally comprising a phenyl group, for instance phenyl trimethicones, phenyltrimethylsiloxydiphenylsiloxanes, diphenylmethyldimethyltrisiloxanes, diphenyl dimethicones, phenyl dimethicones and polymethylphenylsiloxanes; and mixtures thereof. These oils may be present in an amount ranging from 0.01% to 90%, for instance from 0.1% to 85% by weight relative to the total weight of the composition.

The composition according to the present disclosure may also comprise one or more physiologically acceptable organic solvents. These solvents may be generally present in an amount ranging from 0.1% to 90%, for instance from 0.5% to 85%, for example from 10% to 80% and further still from 30% to 50% by weight, relative to the total weight of the composition. Non-limiting mention may be made for example, besides the hydrophilic organic solvents mentioned above, of ketones that are liquid at room temperature such as methyl ethyl ketone, methyl isobutyl ketone, diisobutyl ketone, isophorone, cyclohexanone and acetone; propylene glycol ethers that are liquid at room temperature, such as propylene glycol monomethyl ether, propylene glycol monomethyl ether acetate, and dipropylene glycol mono-n-butyl ether; short-chain esters (containing from 3 to 8 carbon atoms in total), such as ethyl acetate, methyl acetate, propyl acetate, n-butyl acetate and isopentyl acetate; ethers that are liquid at 25° C., such as diethyl ether, dimethyl ether or dichlorodiethyl ether; alkanes that are liquid at 25° C., such as decane, heptane, dodecane, isododecane and cyclohexane; aromatic cyclic compounds that are liquid at 25° C., such as toluene and xylene; aldehydes that are liquid at 25° C., such as benzaldehyde and acetaldehyde, and mixtures thereof.

The composition according to the present disclosure may also comprise at least one physiologically acceptable wax. For the purposes of the present disclosure, the term "wax" means a lipophilic compound that is solid at room temperature (25° C.), which undergoes a reversible solid/liquid change of state, and which has a melting point of greater than or equal to 25° C., which may be up to 120° C. The waxes may be hydrocarbon-based waxes, fluoro waxes and/or silicone waxes and may be of plant, mineral, animal and/or synthetic origin. For instance, the waxes may have a melting point of greater than 30° C. and further still, for example, greater than 45° C. As disclosed herein, waxes that may be used in the composition of the present disclosure, include but are not limited to those made of beeswax, carnauba wax or candellila wax, paraffin, microcrystalline waxes, ceresin or ozokerite, synthetic waxes, for instance polyethylene waxes or Fischer-Tropsch waxes, and silicone waxes, for instance alkyl or alkoxy dimethicones containing from 16 to 45 carbon atoms. The gums are generally polydimethylsiloxanes (PDMSs) of high molecular weight or cellulose gums or polysaccharides, and the pasty substances are generally hydrocarbon-based compounds, for instance lanolins and derivatives thereof, or PDMSs. The nature and amount of the solid substances depend on the desired mechanical properties and textures. As a guide, the composition may contain from 0.1% to 50% by weight, for example, from 1% to 30% by weight of waxes relative to the total weight of the composition.

The composition according to the present disclosure may also comprise, in a particulate phase, pigments and/or nacres and/or fillers usually used in cosmetic compositions. The composition may also comprise other dyestuffs chosen from water-soluble dyes and/or liposoluble dyes that are well known to those skilled in the art. The term "pigments" should be understood as meaning white or colored, mineral or organic particles of any shape, which are insoluble in the physiological medium and which are intended to color the composition. The term "fillers" should be understood as meaning colorless or white, mineral or synthetic, lamellar or non-lamellar particles intended to give body or rigidity to the composition, and/or softness, a matt effect and uniformity to the makeup result. The term "nacres" should be understood as meaning iridescent particles of any form, produced especially by certain molluscs in their shell, or else synthesized. The pigments may be present in the composition in a proportion ranging from 0.01% to 25% and for example in a proportion of from 3% to 10% by weight of the final composition. They may be white or colored, and mineral or organic. Non-limiting mention may be made of titanium oxide, zirconium oxide or cerium oxide, and also zinc oxide, iron oxide or chromium oxide, ferric blue, chromium hydrate, carbon black, ultramarines (aluminosilicate polysulfides), manganese pyrophosphate and certain metallic powders such as silver or aluminium powder. Mention may also be made of the D&C pigments and lakes commonly used to give the lips and the skin a makeup effect, which are calcium, barium, aluminium, strontium or zirconium salts. The nacres may be present in the composition in a proportion ranging from 0.01% to 20% by weight and further, for example, in a proportion ranging from 3% to 10% by weight. Among the nacres that may be envisaged, mention may be made of natural mother-of-pearl, mica coated with titanium oxide, with iron oxide, with natural pigment or with bismuth oxychloride, and also colored titanium mica. Among the liposoluble or water-soluble dyes that may be present in the composition, alone or as a mixture, in a proportion ranging from 0.001% to 15% by weight, for instance 0.01% to 5% by weight and further, for example from 0.1% to 2% by weight, relative to the total weight of the composition. Non-limiting mention may be made of the disodium salt of ponceau, the disodium salt of alizarin green, quinoline yellow, the trisodium salt of amaranth, the disodium salt of tartrazine, the monosodium salt of rhodamine, the disodium salt of fuchsin, xanthophyll, methylene blue, cochineal carmine, halo-acid dyes, azo dyes, anthraquinone dyes, copper sulfate, iron sulfate, Sudan brown, Sudan red and annatto, and also beetroot juice and carotene.

The composition according to the present disclosure may also comprise one or more fillers, for instance in an amount ranging from 0.01% to 50% by weight and for example ranging from 0.02% to 30% by weight, relative to the total weight of the composition. The fillers may be mineral or organic in any form, platelet-shaped, spherical or oblong. Non-limiting mention may be made of talc, mica, silica, kaolin, polyamide (Nylon®) powders, poly-β-alanine powder and polyethylene powder, powders of tetrafluoroethylene polymers (Teflon®), lauroyllysine, starch, boron nitride, hollow polymer microspheres such as those of polyvinylidene chloride/acrylonitrile, for instance Expancel® (Nobel Industrie) or acrylic acid copolymers (Polytrap® from the company Dow Corning) and silicone resin microbeads (for example Tospearls® from Toshiba), elastomeric polyorganosiloxane particles, precipitated calcium carbonate, magnesium carbonate, magnesium hydrocarbonate, hydroxyapatite, hollow silica microspheres (Silica Beads® from Maprecos), glass or ceramic microcapsules, and metal soaps derived from organic carboxylic acids containing from 8 to 22 carbon atoms and for example from 12 to 18 carbon atoms, for example zinc, magnesium or lithium stearate, zinc laurate or magnesium myristate.

As disclosed herein, the composition may also comprise a polymer such as a film-forming polymer. According to the present disclosure, the term "film-forming polymer" means a polymer capable, by itself or in the presence of an auxiliary film-forming agent, of forming a continuous film that adheres to a support, such as to keratin materials. Among the film-forming polymers that may be used in the composition of the present disclosure, non-limiting mention may be made of synthetic polymers, of free-radical type or of polycondensate type, polymers of natural origin and mixtures thereof, for instance acrylic polymers, polyurethanes, polyesters, polyamides, polyureas and cellulose-based polymers, for instance nitrocellulose.

The composition according to the present disclosure may also contain ingredients commonly used in cosmetics, such as vitamins, thickeners, gelling agents, trace elements, softeners, sequestering agents, fragrances, acidifying or basifying agents, preserving agents, sunscreens, surfactants, antioxidants, agents for preventing hair loss, antidandruff agents, propellants and ceramides and mixtures thereof.

Needless to say, a person skilled in the art will take care to select this or these optional additional compound(s), and/or the amount thereof, such that the beneficial properties of the composition according to the present disclosure are not, or are not substantially, adversely affected by the envisaged addition.

The composition according to the present disclosure may be in the form of a suspension, a dispersion, for example oil in water by means of vesicles; an optionally thickened or even gelled aqueous or oily solution; an oil-in-water, water-in-oil or multiple emulsion; a gel or a mousse; an oily or emulsified gel; a dispersion of vesicles, such as, for example, lipid vesicles; a two-phase or multiphase lotion; a spray; a free, compact or cast powder; and anhydrous paste. The composition as disclosed herein may have the appearance of a lotion, a cream, a salve, a soft paste, an ointment, a mousse, a cast or molded solid, for example in stick or dish form, or a compacted solid.

The cosmetic composition according to the present disclosure may be in the form of a care and/or makeup product for bodily or facial skin, the lips, the nails, the eyelashes, the eyebrows and/or the hair, an antisun product, a self-tanning product, or a hair product for caring for, treating, shaping, making up or coloring the hair.

It could be in the form of a makeup composition, for example a complexion product such as a foundation, a makeup rouge or an eyeshadow; a lip product such as a lipstick or a lipcare product; a concealer product; a blusher, a mascara or an eyeliner; an eyebrow makeup product, a lip pencil or an eye pencil; a nail product such as a nail varnish or a nailcare product; a body makeup product; a hair makeup product (hair mascara or hair lacquer). It could also be in the form of a protective or care composition for the skin of the face, the neck, the hands or the body, such as an anti-wrinkle composition, a moisturizing or treating composition; an anti-sun composition or an artificial tanning composition. It could also be in the form of a hair product, such as a composition for coloring, holding the hairstyle, shaping the hair, caring for, treating or cleansing the hair, such as shampoos, hairsetting gels or lotions, blow-drying lotions, and fixing and styling compositions such as lacquers and sprays.

Other than in the operating examples, or where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present disclosure. At the very least, and not as an attempt to limit the application of the doctrine of equivalents to the scope of the claims, each numerical parameter should be construed in light of the number of significant digits and ordinary rounding approaches.

Notwithstanding the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in its respective testing measurement.

The examples that follow are intended to illustrate the present disclosure without, however, being limiting in nature.

EXAMPLES

Example 1

Formulation of Liquid Dispersion of Optically Colored Body

An ultracentrifuge was employed to concentrate aqueous suspensions of polystyrene particles (particle diameter: 254 nm, 209 nm, 143 nm, manufactured by JSR Corporation) such that the concentration of the polystyrene particles comprised 20% by weight of the total mass. A 0.1 M heptane solution of the surfactant Span 85 (HLB=1.3) (manufactured by Wako Chemical Co.) was formulated as the liquid for the liquid dispersion. Finally, liquid dispersions of the optically colored body were obtained by mixing 2 ml of a 0.1 M heptane solution of Span 85 and an aqueous suspension of polystyrene particles, and vibrating sufficiently.

The obtained optically colored bodies were in the form of water-in-oil spherical micelles having a diameter of 25 μm-50 μm, regardless of which polystyrene particles were employed. When irradiated with white light, the optically colored body that included the 254 nm polystyrene particles expressed red color, the optically colored body that included the 209 nm polystyrene particles expressed green color, and the optically colored body that included the 143 nm polystyrene particles expressed blue color.

Figure 4:
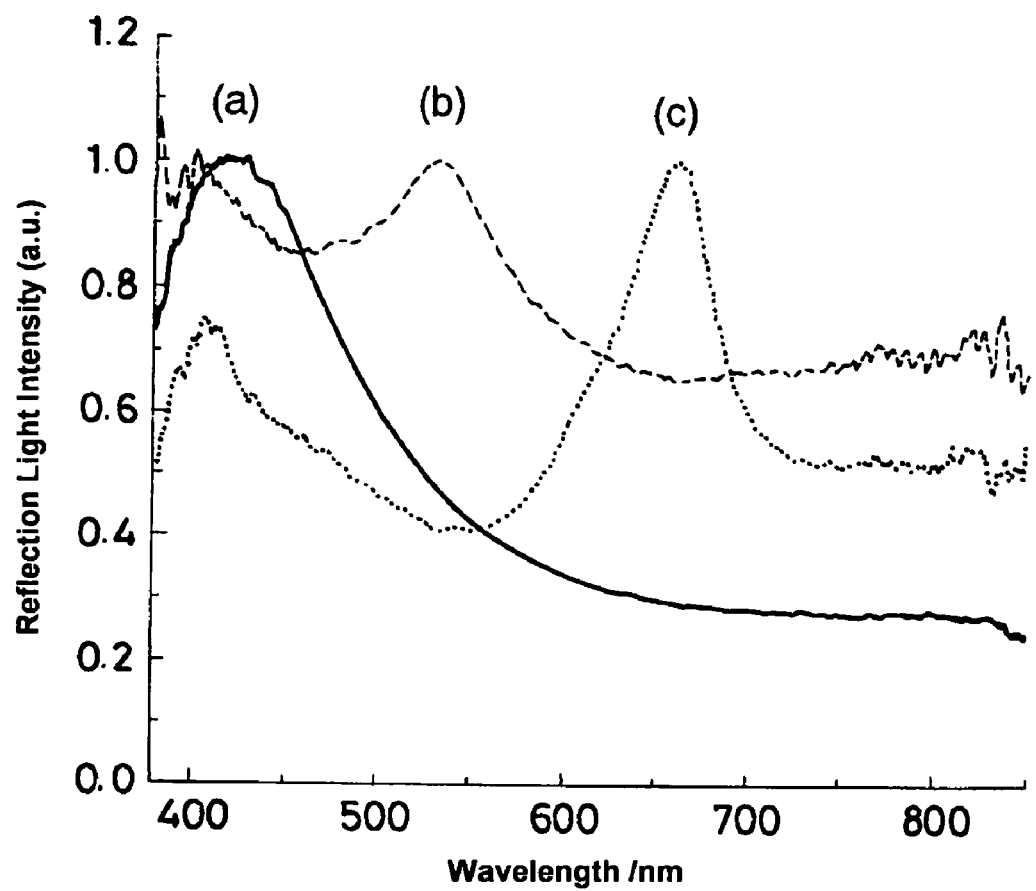
FIG. 4 is a reflection spectrum for the optically colored body according to at least one embodiment of the present disclosure. (a) polystyrene particle diameter: 143 nm, (b) particle diameter: 209 nm, (c) particle diameter: 254 nm

FIG. 4 shows the results of measurement of the reflection spectrum obtained by irradiating each of the optically colored bodies with the halogen light source of an epi-illumination type optical microscope, converging the reflected light with the microscope, and then introducing the reflected light into a small spectrometer (USB2000, manufactured by Ocean Optics Inc.) by means of an optical fiber provided to the microscope. Measurements were conducted using a "Grating No. 2" type diffraction grating and "Slit 25 micron" type slit for the blue optically colored body that included the 143 nm polystyrene particles, and a "Grating No. 3" type diffraction grating and "Slit 5 micron" type slit for the red and green optically colored bodies that included the 254 nm and 209 nm polystyrene particles.

From the results of these measurements, it became clear that reflection characteristics in which 419 nm was the maximum reflected wavelength could be obtained from the blue optically colored body, which included the 143 nm polystyrene particles; reflection characteristics in which 535 nm was the maximum reflected wavelength could be obtained from the green optically colored body, which included the 209 nm polystyrene particles; and reflection characteristics in which 662 nm was the maximum reflected wavelength could be obtained from the red optically colored body, which included the 254 nm polystyrene particles.

Example 2

Formation of Optical Structure

N-isopropylacrylamide (NIPA, manufactured by Wako Chemical Co.) and the black pigment carbon black (manufactured by Tokai Carbon Co., Ltd.) were placed in a glass tube and gelled. The glass tube was then heated with hot water, to obtain slightly shrank black NIPA gel. The inside wall of an equivalent sized glass tube was washed with an aqueous solution of 0.1 M NaOH, after which the NIPA gel was introduced. The space generated between the glass tube and the NIPA gel was filled with a dense aqueous suspension (20% by weight) of polystyrene particles (diameter: 254 nm, 209 nm, 143 nm, manufactured by JSR Corporation).

The space subsequently narrowed due to swelling of the NIPA gel, to obtain an optical structure for expressing structural color due to the formation of a colloid particle array within the curved space. By varying the size of the polystyrene particles employed, it was possible to generate bright red (particle diameter: 254 nm), green (particle diameter: 209 nm), or blue (particle diameter: 143 nm) with this optical structure.

Further, even if rotated in the longitudinal direction of the cylindrical optical structure, this optical structure was capable of consistently returning uniform and constant light irrespective of the direction of the polystyrene array, the direction of the light source, or the direction of observation.

Figure 5:
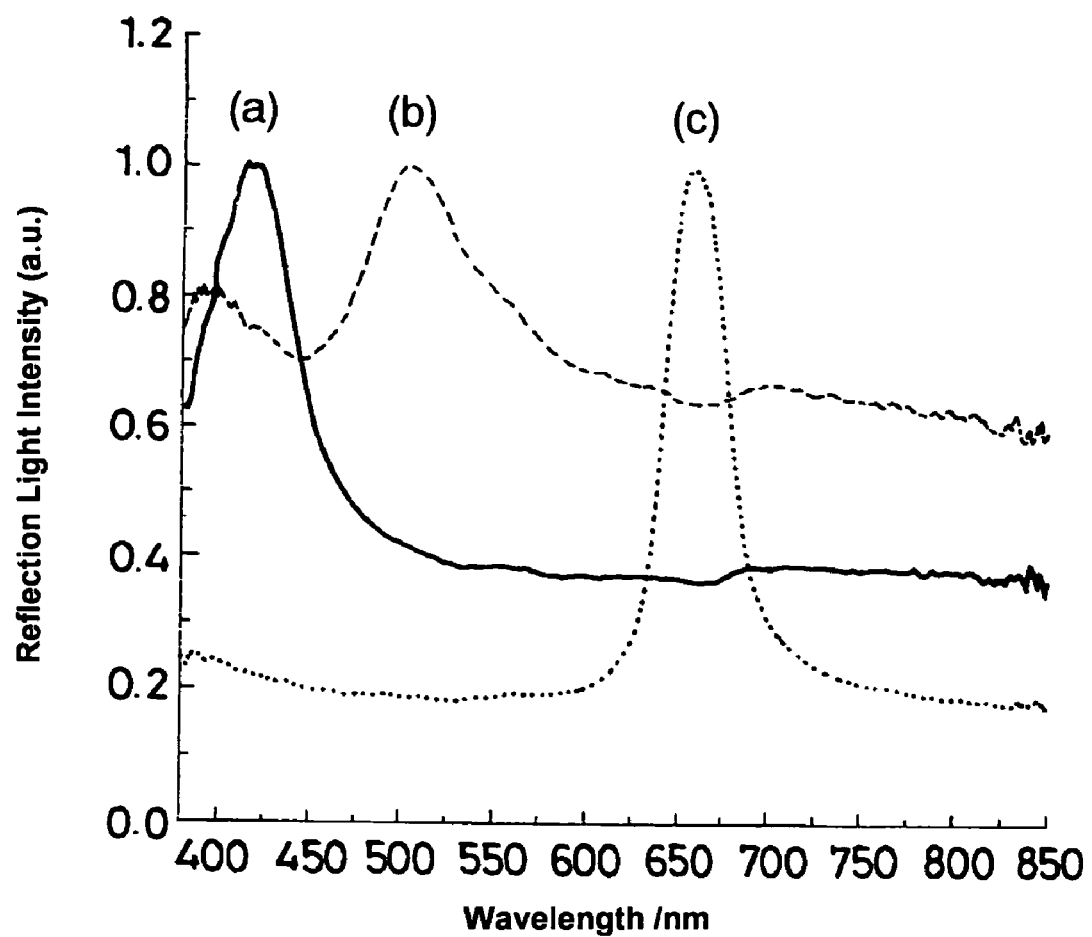
FIG. 5 is a reflection spectrum for the cylindrical optical structure according to at least one embodiment of the present disclosure. (a) polystyrene particle diameter: 143 nm, (b) particle diameter: 209 nm, (c) particle diameter: 254 nm The present disclosure will now be explained in greater detail with reference to the attached figures.

FIG. 5 shows the results of measurement of the reflection spectrum obtained by irradiating each of the optical structures with the halogen light source of an epi-illumination type optical microscope, converging the reflected light with the microscope, and then introducing the reflected light into a small spectrometer (USB2000, manufactured by Ocean Optics Inc.) by means of an optical fiber provided to the microscope. Measurements for all of the optical structures were conducted using a "Grating No. 2" type diffraction grating and "Slit 25 micron" type slit.

From the results of these measurements, it became clear that reflection characteristics in which 418 nm was the maximum reflected wavelength could be obtained from the blue optical structure, which included the 143 nm polystyrene particles; reflection characteristics in which 504 nm was the maximum reflected wavelength could be obtained from the green optical structure, which included the 209 nm polystyrene particles; and reflection characteristics in which 660 nm was the maximum reflected wavelength could be obtained from the red optical structure, which included the 254 nm polystyrene particles.

What is claimed is:

1. A cosmetic composition comprising at least one optically colored body comprising at least one micelle, wherein the at least one micelle comprises a liquid medium and colloid microcrystals having aggregates of spherical nano-particles, wherein the diameters of the spherical nano-particles are chosen from diameters ranging from 50 to 500 nm, wherein the spherical nano-particles are chosen from macromolecular polymer materials and inorganic materials, and wherein the liquid medium is selected from polar liquids, and wherein the cosmetic composition further comprises a cosmetically acceptable medium.

2. A cosmetic composition comprising an optically colored body according to claim 1, wherein, under light irradiation, the colloid microcrystals select light and express color of a specific wavelength due to the photonic band effect.

3. A cosmetic composition comprising an optically colored body according to claim 1, wherein the spherical nano-particles comprise a single material.

4. A cosmetic composition comprising an optically colored body according to claim 1, wherein the spherical nano-particles have the same particle diameter.

5. A cosmetic composition comprising an optically colored body according to claim 1, wherein the spherical nano-particles are optically transparent with respect to light of a specific wavelength.

6. A cosmetic composition comprising an optically colored body according to claim 1, wherein the refractive index of the material of the spherical nano-particles is either greater or smaller than the refractive index of the liquid medium.

7. A cosmetic composition comprising at least one optical structure, wherein the at least one optical structure comprises at least one substrate and at least one wall that covers the at least one substrate and has optical transparency, wherein the space between the at least one substrate and the at least one wall is filled with colloid microcrystals having arrays of spherical nano-particles, and wherein said cosmetic composition further comprises a cosmetically acceptable medium.

8. A cosmetic composition comprising an optical structure according to claim 7, wherein, under light irradiation, the colloid microcrystals select light and express color of a specific wavelength due to the photonic band effect.

9. A cosmetic composition comprising an optical structure according to claim 7, wherein the at least one substrate is spherical or cylindrical in shape.

10. A cosmetic composition comprising an optical structure according to claim 7, wherein the at least one substrate comprises a N-isopropylacrylamide (NIPA) gel material.

11. A cosmetic composition comprising an optical structure according to claim 7, wherein the at least one wall is optically transparent with respect to the reflected light of a specific wavelength from the colloid microcrystals.

* * * * *